Inventors:-
Russell C. Turner,
Raymon G. Walker,
BY Hofgren, Brady,
Wegner, Allen & Stellman Attys.

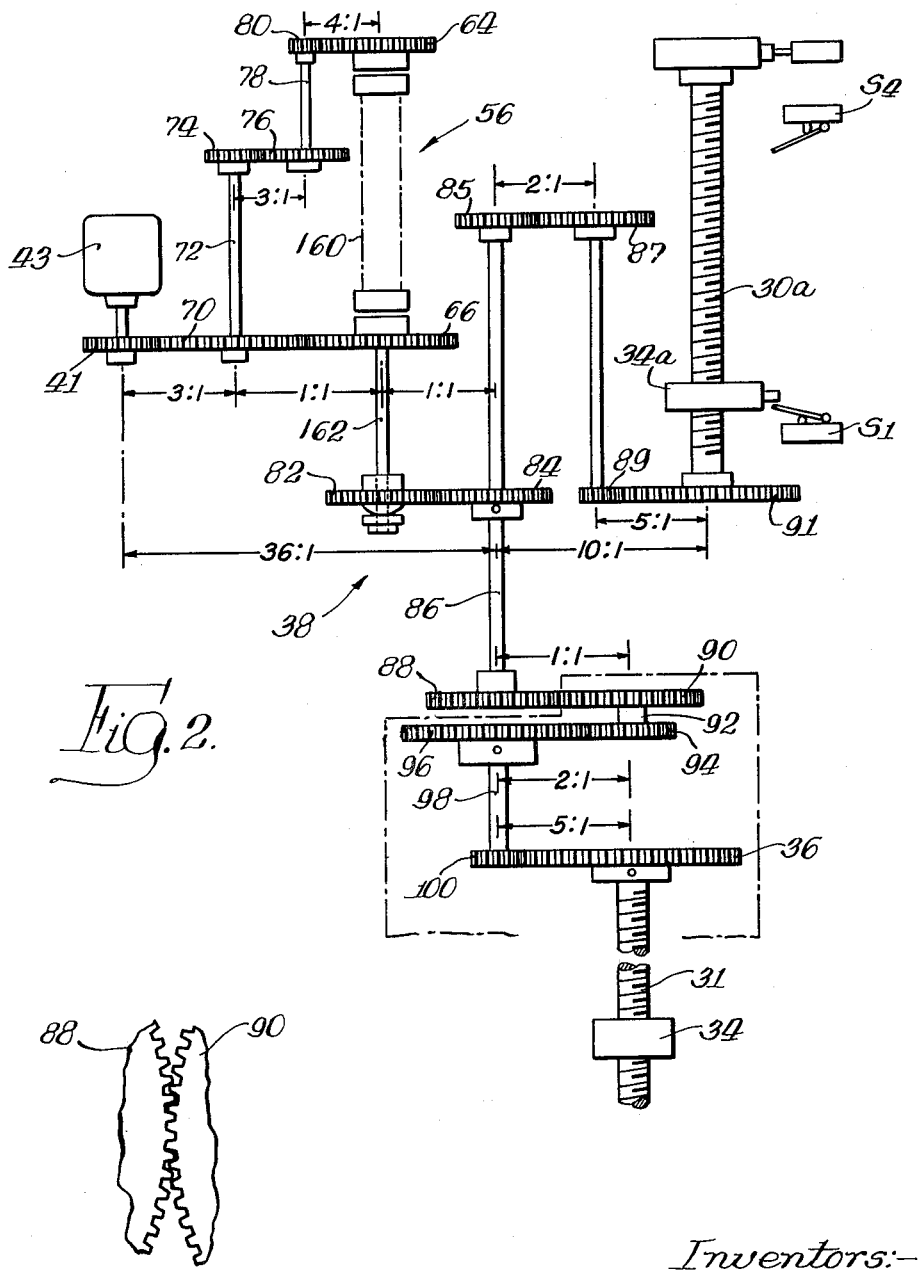

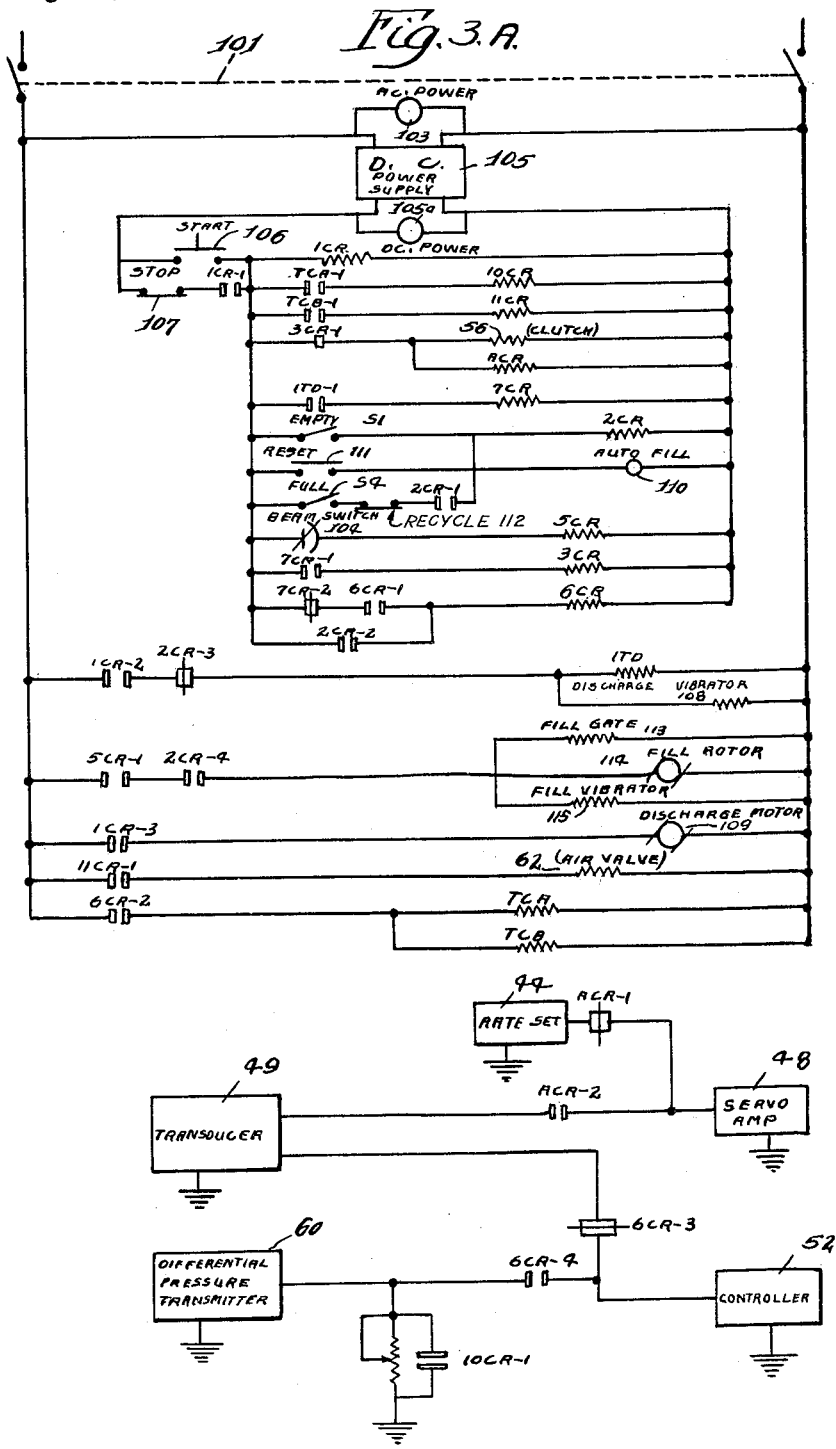

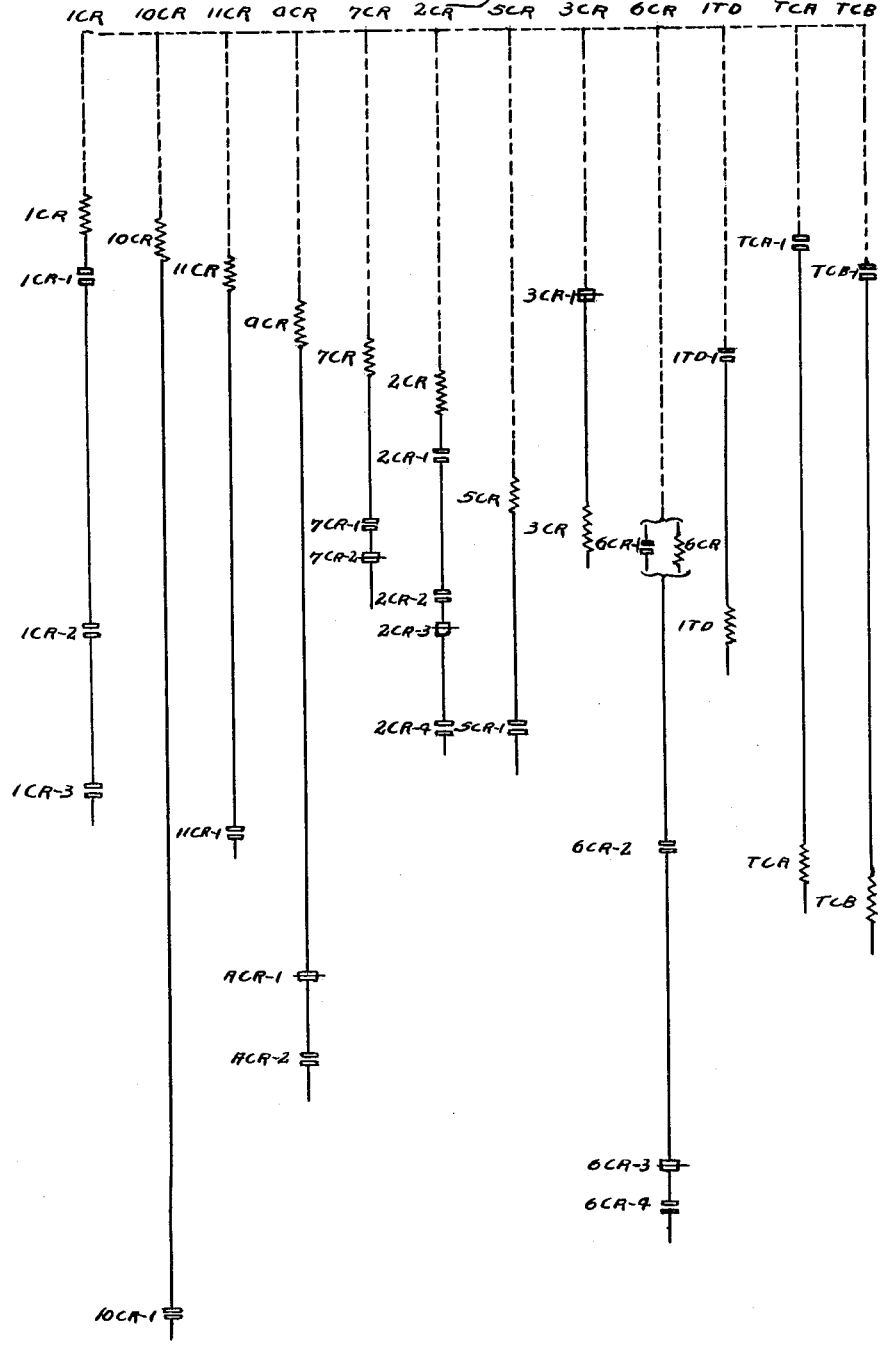
Fig. 3.B.

United States Patent Office 3,099,368
Patented July 30, 1963

3,099,368
DISPENSING APPARATUS HAVING LOSS OF WEIGHT HOPPER
Russell C. Turner, Abington, and Raymon G. Walker, South Weymouth, Mass., assignors, by mesne assignments, to Cutler-Hammer, Inc., Milwaukee, Wis., a corporation of Delaware
Filed Aug. 30, 1960, Ser. No. 52,962
14 Claims. (Cl. 222—58)

This invention relates to apparatus for controlling the rate of flow of material, whether solid, liquid, or gaseous, to obtain delivery of predetermined accurately measured quantities by per unit time.

In one form, such apparatus operates on a loss of weight principle and comprises a system of levers, including a weigh arm, a hopper supported by the arm, a poise, a screw on the weigh arm for effecting movement of the poise therealong, a gate for controlling the discharge of material from the hopper, a motor for driving the screw and hence the poise at a speed which will remove weight from the arm at a rate proportional to the delivery desired, and means for automatically adjusting the gate to compensate for departure of the weigh arm from a balanced condition due to non-uniform discharge.

The objects of this invention are to provide apparatus of the foregoing kind, wherein error introduced by oscillation of the weigh arm is minimized, wherein hunting to re-establish balance is minimized, wherein the driving forces imparted to the poise driving screw are applied in such manner as to eliminate false deviation of the weigh arm, and to provide apparatus which is highly sensitive to operative deviations and is self-correcting.

As herein illustrated, the apparatus has a weigh arm supported by flexure plates which constitute the fulcrum for the arm and which normally tend to hold the weigh arm in equilibrium, their effect being to resist displacement and hence to absorb vibrations without reflection on the weigh arm. A hopper for the bulk material is mounted on the weigh arm as is also a screw and poise, the latter being movable by rotation of the screw to maintain the arm in balance as the material is discharged from the hopper. The hopper contains a bottom opening through which the material is adapted to flow and flow is controlled by a gate movable to change the rate of discharge. A pneumatic positioner controls the position of the gate. To effect a measured discharge flow, per unit of time, the poise is driven along the weigh arm at a uniform rate, which is directly proportional to the amount to be delivered from the hopper. To compensate for slight deviations from equilibrium due to non-uniform flow, there is a transducer means responsive to such deviations to effect operation of the pneumatic positioner in a manner to move the gate to increase or decrease the flow, as may be necessary to restore equilibrium to the arm. The transducer means is responsive to the direction and magnitude of deflection of the weigh arm from neutral, to apply an A.C. voltage to a deviation indicator or recorder and an electronic controller. The output of the controller is applied to an electropneumatic transducer which in turn supplies air to the pneumatic gate positioner.

Uniformity of rate of movement of the poise is effected by a servomotor situated in a closed loop containing a tachometer operably connected to the servomotor, a rate setter and a servo-amplifier. The tachometer functions as a differential, its output representing change in speed of the motor and being imposed on the servo-amplifier as a second input, to bring the servomotor back to its proper speed. The rate setter is in the form of a precision potentiometer, calibrated directly in pounds per hour, so that by setting its arm the servomotor may be caused to move the poise at a rate to discharge a predetermined number of pounds per hour. During the fill cycle or mode, the beam deflection transducer is connected to the servo-amplifier and the mechanism operates as a servo-balance system.

When the hopper is nearly empty, a filling operation is initiated during which content of the hopper is replenished and the poise returned to its starting position without interrupting the discharge. To hold the gate open during the filling portion of the cycle there is means for disconnecting the transducer from the controller and a further control to maintain the gate position.

A screw drives the poise and a gear train is provided to effect rotation of the screw. The screw is driven at a constant rate during retraction of the poise and at a speed depending upon the rate setter. It is desirable to return the poise at a much faster rate than it is retracted, and hence there is a clutch operable to shift gears within the gear train to produce high speed rotation of the screw. To prevent the driving force, applied to the gear on the screw, from deflecting the weigh arm, the gearing is designed so that the driving forces applied to the gear on the screw are imparted in a series of rapid light blows which do not overcome the inertia of the arm.

Further objects and advantages will become apparent from the following detailed description taken in connection with the accompanying drawings in which:

FIG. 2 shows details of the gearing between the servomotor and poise screw;

FIG. 3A is diagram of an electrical control circuit for the apparatus;

FIG. 3B is a key therefor; and

FIG. 4 is an enlarged view of a portion of the drive for the poise screw, showing the last gear of the driving train and the driven gear fixed to the screw.

Figure 1:
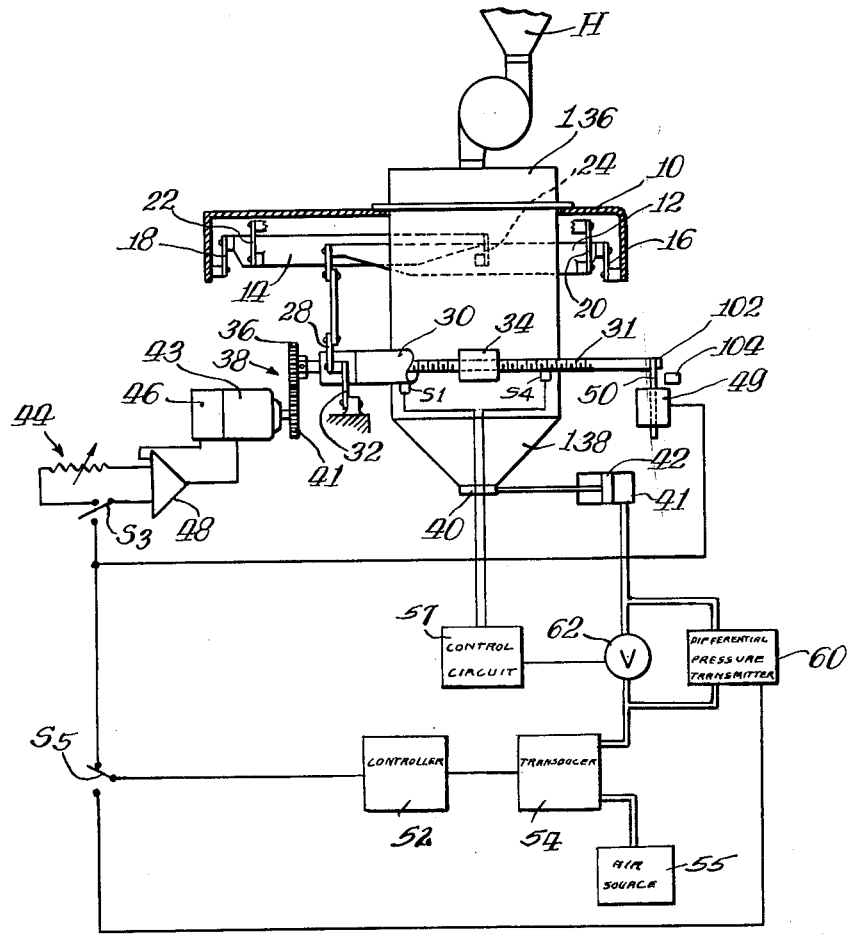
FIG. 1 is a diagrammatic representation of an embodiment of the invention.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring to the drawings, there is a scale platform 10 suspended from the outer ends of levers 12 and 14, by flexure plates 16 and 18. The levers 12 and 14, in turn, are suspended inwardly of their outer ends on flexure plates 20 and 22, fixed to the frame of the apparatus. The inner end of the lever 14 is connected to the lever 12 by a flexure plate 24. A weigh arm 30 is supported near one end, between flexure plates 28 and 32, the plate 28 being connected to the inner end of the arm 12 and the plate 32 to the frame of the apparatus. A poise 34 is mounted on the weigh arm 30 on a screw 31, and is movable along the arm by rotation of the screw. As thus arranged, the lever system and weigh arm embody the advantages attained by the apparatus shown in the Thayer Patents Nos. 2,741,450 and 2,741,472, to which reference may be had for a more specific description.

The general operation of the system will be described in connection with the simplified, diagrammatic showing of FIG. 1. In accordance with the present invention, the hopper 136, supported by the aforesaid scale, has a conical lower portion 138 with an opening in the form of a delivery orifice at its lower end. A gate 40 is arranged to move across the opening to change the area and hence the flow of material from the hopper. Movement of the gate is effected by a pneumatic positioner which is an air cylinder 41 containing a piston 42. The flow of material from the hopper is controlled, so as to deliver a predetermined quantity, per unit of time, by moving the poise 34 at a constant speed to vary the distance of the poise from the fulcrum in proportion to the quantity of material which is to be discharged from the hopper, and by employing any departure of the weigh arm from its balanced position, in either direction, to actuate means for changing the position of the gate 40, to increase or decrease the flow. This may be referred to as a loss of weight system of controlling flow in predetermined quantities by weight per unit of time.

As herein illustrated, the screw 31 has fastened to its rear end a gear 36, which in turn meshes with one of a train of gears 38. The train of gears is driven by a gear 41 fixed to the shaft of a servomotor 43. A manually controllable rate setter 44, here a precision potentiometer which may be calibrated directly in pounds per hour, provides for varying a control signal applied through amplifier 48 to the servomotor and may be mechanically set by adjustment of its arm to drive the servomotor at a predetermined speed and hence to move the poise along the beam at a predetermined speed. To maintain the speed of the servomotor constant a tachometer 46 is connected to the motor shaft. If the motor varies from the constant speed set into it by the rate setter, the tachometer output which depends upon the speed of the motor is fed back as a second input into a servo-amplifier 48 to increase or decrease the voltage applied to the servomotor, so as to bring it back to the correct speed.

If the servomotor 43 is rotated at a constant speed, the screw 31 will move the poise 34 along the arm at a constant speed, and if the hopper is discharging an amount which corresponds proportionately to the change in distance between the poise and the fulcrum, the weigh arm will remain in balance. Since the material, even under ideal conditions, will not flow uniformly through the orifice, at times, the flow will get ahead of the poise 34 so that the hopper is too light, which will tip the arm clockwise with reference to its fulcrum and at other times it will not flow fast enough, hence the hopper will be too heavy and the weigh arm will move counterclockwise with reference to its fulcrum. These deflections of the weigh arm, from its normally balanced condition, are employed to vary the position of the gate 40 to increase or decrease the flow by changing the area of the orifice through which material may flow at any given time. To this end a weight transducer 49 is mounted adjacent the free end of the weigh arm. The transducer is preferably a differential transformer the core 50 of which is mounted on the end of the arm for movement axially through the transducer coils, the latter being adjusted so that at a balanced position, the output is zero. The direction of off-balance of the weigh arm determines the phase and magnitude of the output voltage which is applied to an electronic controller 52 of a well known type, which in one preferred form is that manufactured and sold under the trade name of "Autronic" Unitized Controller by the Swartwout Company, Cleveland, Ohio.

During the automatically controlled discharge portion of the cycle, the signal from the weigh arm transducer 49 acts through controller 52 to supply a control signal to an electropneumatic transducer 54 which supplies pneumatic pressure, as from a source of compressed air 55 to the piston and cylinder control 41—42 for discharge gate 40. A rotary feeder operating at a constant speed may be employed in conjunction with the controllable orifice gate 40 to maintain the desired rate of discharge of the material.

When the hopper is nearly empty the poise 34 engages an empty limit switch S1 which effects actuation of a clutch 56 (FIG. 2) by energizing its coil to rotate the screw 31 at a high speed returning the poise 34 to the filled balance position at a rapid rate. At the same time, as will appear, switches S3 and S5 are actuated by control circuit 57. Switch S3 disconnects the rate setter 44 from amplifier 48 and impresses the differential transformer voltage on the amplifier causing the servomotor 43 to operate at a high speed while returning the poise 34. Switch S5 disconnects the output of transducer 49 from the controller 52 and connects the controller input to differential pressure transmitter 60 which senses the pressure across valve 62 in the line from the transducer 54 to the cylinder 41 of the pneumatic positioner. Valve 62 is closed by control circuit 57 during the "fill" operation holding the air pressure in pneumatic positioner constant, maintaining the gate position. The output of differential pressure transmitter 60 maintains an operating condition in controller 52 and transducer 54 such that the actuating condition for the gate positioner when the "discharge" portion of the cycle is reestablished is identical with the condition maintained during "fill." It is desirable that "fill" position of the cycle take place as rapidly as possible to minimize the time during which the discharge rate is not directly controlled. While the poise 34 is returned to its "filled" position the hopper is refilled from a source H and when the poise reaches its "filled" position it actuates a "full" limit switch S4 which deenergizes the clutch 56 so that it is shifted back to its initial position and also restores the switches S3 and S5 to their original position so that servomotor 48 is again controlled by setter 44 and controller 52 by the output of transducer 49.

The clutch 56 (FIG. 2) functions to change the speed of rotation of the screw and is designed to transmit rotational force to the screw without disturbing the static equilibrium of the arm which would adversely affect its balance. As shown (FIG. 2), the clutch 56 is in the form of a sleeve 160, movable axially on a shaft 162, in one direction or the other. The clutch is, however, splined on the shaft so that rotation of the clutch sleeve imparts rotation to the shaft. Two gears 64 and 66 are loosely mounted on the shaft 162, at opposite ends, respectively, of the clutch sleeve 160. By shifting the clutch sleeve in one direction the gear 64 may be caused to rotate with the clutch sleeve and hence to rotate the shaft 162 in one direction and by shifting it in the opposite direction, the gear 66 may be caused to rotate with the clutch sleeve and hence to rotate the shaft 162 in the opposite direction. The servomotor 43 has on its shaft a gear 41 which meshes in a 3 to 1 ratio with a gear 70 fast to one end of a shaft 72, the opposite end of which has fast on it a gear 74. The gear 70 meshes directly in a 1 to 1 ratio with the gear 66. The gear 74 meshes with a gear 76 in a 3 to 1 ratio, fast to one end of a shaft 78, the opposite end of which has fast to it a gear 80 which meshes with a gear 64 in a 4 to 1 ratio. Thus the shaft 162 may be driven by the servomotor 43 at a fast rate through the gears 41, 70, 66 and at a slow rate through the gears 41, 70, 74, 76, 80 and 64. The shaft 162 has fastened to it a gear 82, which meshes in a 1 to 1 ratio with a gear 84 fast to a shaft 86, the latter being flexible. A gear 88 is fast to the flexible shaft 86 and meshes in a 1 to 1 ratio with the gear 90 fixed to a shaft 92. A gear 94 is fixed to the shaft 92 and meshes in a 1 to 2 ratio with a gear 96 which is fixed to a shaft 98. At the end of the shaft 98 there is fixed a gear 100. Up to the gear 88 the shafts and the gears are mounted on the frame of the apparatus and fixed with respect thereto. The gears 90, 94, 96, 100 and 36 are a part of the poise assembly and hence float, that is, move with the weigh arm as the latter moves about its fulcrum. Because of the fixed and floating relation between the gears 88 and 90, the forces applied by the gear 88 to the gear 90 tend to deflect the arm, thus introducing an error. To minimize this the gear 88 is driven at a relatively high speed by way of the aforesaid clutch 56 and gears 41, 70, 74, 76, 80 and 64, so that the period of driving contact between the teeth on the gears 88 and 90 is short (FIG. 4). By applying the driving forces in a very short space of time and with gears having a 1 to 1 ratio, no single blow is sufficient to overcome the inertia of the arm and hence the arm is free of any error introduced in this fashion.

The limit switches S1 and S4 may be mechanically actuated by a trip 34a mounted on an auxiliary screw 30a driven at the same speed as the poise screw 31 by a series of gears 85, 87, 89 and 91, rather than directly from poise 34.

The detailed operation of a preferred embodiment of a control circuit for the system will now be considered with reference to the circuit illustrated in FIG. 3. FIG. 3A is an "across-the-line" control circuit diagram; and FIG. 3B provides a key to the interrelation of the various relays, timers and their associated contacts.

The control circuit is energized by closing line switch 101 connecting the circuit with a suitable source of power as 120 volts A.C. Lamp 103 is connected across the line indicating the presence of A.C. power. Much of the control circuitry is powered from a direct current power supply 105 connected across the line and having an associated lamp 105a which indicates the presence of D.C. power.

For the purpose of the following discussion, it will be assumed that the hopper 36 is filled and the poise 34 in the filled position. When "Start" switch 106 is closed, relay 1CR is energized closing the contacts associated therewith. Contacts 1CR-1 complete a holding circuit through "Stop" switch 107 maintaining relay 1CR energized after the "Start" switch is released. Contacts 1CR-2 complete a circuit through normally closed contacts 2CR-3 to energize timer 1TD, and discharge vibrator 108, associated with the hopper 36. Contacts 1CR-3 also close energizing discharge motor 109. As soon as the timer 1TD has completed its cycle, which requires only a few seconds, the associated contact 1TD-1 closes completing a circuit energizing relay 7CR.

Relay 7CR actuates two sets of contacts. Contacts 7CR-1 close completing an energizing circuit for relay 3CR while contacts 7CR-2, in the holding circuit for relay 6CR, which will be described later, open.

Relay 3CR, when energized, opens its associated contacts 3CR-1 breaking the energization circuit for poise drive clutch 56 and relay ACR, which affects the input to the servo amplifier 48. When relay ACR is de-energized, contacts ACR-1 are closed connecting the rate-set means 44 with the input of servo amplifier 48, and contacts ACR-2, between the beam transducer 49 and the servo amplifier are opened. The contacts ACR-1 and ACR-2 correspond with switch S3 of FIG. 1.

In this condition of the circuit, the apparatus operates in the discharge portion of its cycle, the signal from the rate-set means 44 controlling the servo amplifier 48 and its associated mechanism to drive the poise 34 at a constant rate while the signal from the beam transducer 49 is coupled to the controller 52 to actuate transducer 54 and maintain the discharge of the material from the hopper at the proper rate.

When the hopper 36 is substantially empty, "Empty" switch S1 is closed, as described above. This completes the energizing circuit for relay 2CR and also lights "Automatic Fill" lamp 110. Contacts 2CR-1 close completing a holding circuit for relay 2CR through "Filled" switch S4 and "Recycle" switch 112. A "Reset" switch 111 is connected in parallel with "Empty" switch S1 and may be operated to refill the hopper 36 at any time, if this should be desirable.

Contacts 2CR-2 close energizing relay 6CR. Contacts 2CR-3 open interrupting the circuit for timer 1TD and stopping discharge vibrator 108. Contacts 2CR-4 close completing a circuit through contacts 5CR-1 energizing fill gate 113, fill rotor motor 114 and fill vibrator 115. Contacts 5CR-1 are closed as relay 5CR is energized through beam switch 104 which is closed during normal operation of the apparatus. This switch is arranged to be opened when the beam is excessively out of balance during the filling to prevent the refilling from getting too far ahead of the movement of the poise along the arm. As best seen in FIG. 1, a magnet 102 operates the switch, which is preferably a mercury switch, when the arm moves downwardly bringing the magnet close to the switch. This immediately opens contacts 5CR-1 breaking the circuit to the fill gate 112, fill rotor 113 and fill vibrator 114, and stopping the fill operation until the poise moves far enough along the arm to bring the parts more or less into balance.

Relay 6CR, which is energized on the closing of contacts 2CR-2, closes its associated contacts 6CR-1 energizing timers TCA and TCB. Contacts 6CR-3 open disconnecting the transducer 49 from the input of controller 52. At the same time, contacts 6CR-4 close connecting the signal from differential pressure transmitter 60 to the controller. However, timer TCA upon energization closes its associated contacts TCA-1 energizing relay 10CR and closing contacts 10CR-1 for a brief period, as two seconds. This shorts the output of the differential pressure transmitter 60 to ground allowing the discharge gate to be properly positioned. When the timer TCB shortly thereafter completes its cycle, contacts TCB-1 close, energizing relay 11CR, closing contacts 11CR-1 and energizing valve 62 in the air line from transducer 54 to the gate control, locking the gate in position. Contacts 6CR-3 and 6CR-4 correspond with S5 of FIG. 1.

When timer 1TD is de-energized, upon the opening of contacts 2CR-3, associated contacts 1TD-1 open breaking the energization circuit to relay 7CR. This in turn opens contacts 7CR-1 and closes contacts 7CR-2. The opening of contacts 7CR-1 breaks the energization circuit to relay 3CR allowing contacts 3CR-1 to close energizing clutch 56 and relay ACR. The action of clutch 56 upon energization is described above, reversing the drive of the poise returning it along the beam at a rapid rate. Relay ACR has two set of contacts, ACR-1 and ACR-2, which are actuated to connect the input of servo amplifier 48 to the output of transducer 49.

At the end of the filling operation, "Full" switch S4 opens breaking the holding circuit for relay 2CR. Holding contacts 2CR-1 are opened as are contacts 2CR-2 in the circuit of relay 6CR. Contacts 2CR-3 close energizing the discharge vibrator and timer 1TD as described above. Contacts 2CR-4 open breaking the circuit for the fill gate 113, fill rotor 114 and fill vibrator 115. Contacts 6CR-3 and 6CR-4 reverse their positions returning to the condition shown in the drawing, connecting the output of transducer 49 with the input of controller 52.

Similarly, as relay 1TD operates, relay 7CR is energized, energizing relay 3CR, breaking the circuit through controls 3CR-1 to clutch coil 56 and relay ACR, and breaking the holding circuit for relay 6CR. The system is then again automatically controlled as described above and the operation repeated.

We claim:

1. In an apparatus for controlling the flow of material, a weigh arm, flexure plates supporting the weigh arm in equilibrium, a hopper on the arm, a poise movable along the arm to unload it at a predetermined rate, a discharge opening at the bottom of the hopper through which material is adapted to be discharged at a rate proportional to the unloading of the arm, a gate operably controlling the size of the opening, a controller responsive to an error voltage, establishing a signal for controlling said gate, a differential transformer for applying an error voltage according to the direction and magnitude of movement of the arm to the controller, a power relay operable in accordance with the signal from said controller to effect operation of the gate, means for rendering the differential transformer ineffective, when the hopper is substantially empty, means actuated when the hopper is substantially empty for refilling the hopper, and means for establishing a signal from said controller maintaining the gate in a predetermined position during refilling of the hopper.

2. In an apparatus for controlling the flow of material comprising a system of levers, including an arm and flexure plates supporting the arm in stable equilibrium, a hopper supported by the arm having a discharge opening through which its content may be discharged, a device for discharging the content through the opening, a poise movable along the arm, a servomotor for moving the poise at a constant speed along the arm, which is proportional to the desired rate of discharge, means for sensing a departure of the arm from its balanced state, means responsive to said sensing means for adjusting the discharging device for affecting the rate of discharge to restore the arm to balance, means for maintaining the speed of the servomotor constant, means for reversing the rotation of the screw when the hopper is empty to return the poise along the arm at a fast rate of speed, means for holding the discharge gate open during refill, and means for disconnecting said sensing means from the device for discharging the container and for connecting it to control the servomotor as the poise is returned along the arm.

3. Apparatus comprising a dispensing hopper a weigh arm, flexure plates supporting the dispensing hopper and weigh arm in equilibrium, a screw on the arm, a poise on the screw and movable therealong, a gear fixed to the screw to effect rotation thereof, a servomotor mounted apart from the arm, a gear train driven by the servomotor, one of the gears of the train being operable to drive the gear on the screw and another being driven by the servomotor means for sensing an empty condition of said hopper, a reversing clutch included in the gear train to effect rotation of the screw in one direction to retract the poise at a slow speed and said clutch being actuated by said sensing means to effect rotation of the screw in the opposite direction to advance the poise at a high speed.

4. In a weighing system, including a weigh arm supported by flexure plates, a hopper on the arm, a screw on the arm and a poise movable along the screw to balance the hopper, means for effecting movement of the poise along the screw to unload the arm, means including a gate for unloading the hopper at a corresponding rate including a differential transformer for sensing a deflection of said arm and means responsive to said differential transformer for changing the gate opening to maintain the rate of unloading in pace with the poise, and a low limit switch operable in response to an empty condition of said hopper to render the transformer ineffectual in controlling said gate and to lock the gate at the opening it had at the instant of operation of the low limit switch.

5. In a weighing system according to claim 4, a clutch operable by the low limit switch to rotate the screw at a high speed to return the poise to its outermost position.

6. In a weighing system acording to claim 5, a high limit switch operable as the poise reaches its outer limit to disengage the clutch to return low speed rotation to the screw and to unlock the gate.

7. Apparatus comprising: a weigh arm having a hopper thereon; flexure plates supporting the weigh arm; a poise movable along the arm, said poise driven by a first gear train mounted upon the arm; a servo motor mounted apart from the arm; means for keeping the speed of said servo motor constant; a second gear train mounted apart from said arm, driven by said servo motor and connected with said first gear train, whereby said first-named gear train is driven by said servo motor without disturbing the equilibrium of said arm; a low limit switch operable as the poise nears the fulcrum; a clutch in the gear train for reversing the rotation of the screw when the hopper is empty to return the poise along the arm at a fast rate of speed; means for locking the discharge gate of the hopper open during refill; and a high limit switch operable as the poise reaches its outer limit to disengage the clutch, to return lower speed rotation to the screw, and to unlock the gate.

8. In a dispensing apparatus: a hopper; a discharge gate regulating the flow of material from said hopper; a pneumatic positioner controlling said gate to regulate material flow therefrom; an air source delivering air pressure to actuate said positioner; a regulating means in the air supply line to said positioner; and a control means controlling said regulating means whereby during refill of said hopper said discharge gate is held in an open position and immediately upon completion of refill, said gate is in the same condition as during refill.

9. In a dispensing apparatus: a hopper; a discharge gate on said hopper; a pneumatic positioner controlling the gate to regulate material flow therefrom; an air source delivering air pressure to actuate said positioner; a control valve in the air supply line to said positioner; and control means including regulating means intermediate said valve and said air source which is responsive to departure in the rate of discharge of material out of said hopper from a predetermined rate to vary the air pressure to said positioner in accordance therewith and further including means responsive to near empty condition of said hopper to close said valve and thereby maintain the air pressure on said positioner constant during refilling of the hopper at that value last provided by said regulating means.

10. In a dispensing apparatus: a hopper; a discharge gate on said hopper; a pneumatic positioner controlling the gate to regulate material flow therefrom; an air source delivering air pressure to actuate said positioner; a control valve inserted in the air supply line to said positioner; a transducer inserted in the air supply line between said valve and the air source; a controller means, the output of which controls said transducer; and a differential pressure transmitter, the output of which actuates said controller during the refill of the hopper whereby, upon completion of the refill cycle, the gate condition is identical with the condition maintained during fill.

11. In a dispensing apparatus for regulating the flow of material: a hopper; a discharge gate regulating the flow of material from said hopper; a pneumatic positioner controlling said gate; an air source supplying air pressure for said positioner; a control valve in the air supply to said positioner; a control circuit closing the valve during refill of said hopper; a differential pressure transmitter in parallel with said valve; a transducer in series with said parallel combination and the air source; and a controller actuating said transducer, and during refill of said hopper, said controller receives an input from said differential pressure transmitter, whereby said control circuit closes the valve resulting in the pneumatic positioner being held constant maintaining the gate in position, and upon completion of the refill cycle, the gate condition is identical with the condition maintained during fill.

12. In an apparatus for controlling the flow of material comprising: a hopper supported by a weigh arm having a discharge opening through which its contents may be discharged; a poise movable along the arm; a servo motor for moving the poise along the arm; means for sensing departure of the arm from its balanced state; means responsive to said sensing means for adjusting the discharge opening to restore the arm to balance; means for reversing the movement of the poise when the hopper is empty to return the poise along the arm; and means for disconnecting the sensing means from the second-named means and connecting it to control the servo motor as the poise is returned along the arm.

13. In an apparatus for controlling the flow of material comprising: a system of levers; including an arm and flexure plates supporting the arm in stable equilibrium; a hopper supported by the arm having a discharge opening through which its contents may be discharged; a pneumatic positioner controlling the discharge opening; a poise movable along the arm; a servo motor for moving the poise along the arm at a speed proportional to the desired rate of discharge; a differential transformer connected to the arm for sensing departure of the arm from the balance state; a controller responsive to the output of the differential transformer, which adjusts said pneumatic positioner and varies the rate of discharge, restoring the arm to balance; a clutch reversing the rotation of the screw when the hopper is empty to return the poise along the arm at a fast rate of speed; and a switch disconnecting the differential transformer from said pneumatic positioner and connecting it to said servo motor during refill whereby the poise is returned at a fast rate of speed.

14. In a dispensing apparatus for regulating the flow of material: a hopper supported by a weigh arm; a control gate on said hopper; a pneumatic positioner controlling the gate; an air source for said positioner; a poise movable along the arm; a servo motor for moving the poise along the arm; means for sensing departure of the arm from its balanced state; means connecting said sensing means with said gate positioner for controlling the gate position during discharge; means for reversing the movement of the poise when the hopper is empty to return the poise along the arm; a control means for connecting the sensing means to the servo motor during refill whereby the poise is returned at a fast rate of speed during refill of the hopper; a control valve inserted in the air supply line between said positioner and the air source; a control circuit which closes said valve maintaining said gate in an open condition during refill; a transducer in the supply line between said valve and the air source; a controller which controls said transducer; and a differential pressure transmitter across said valve, the output of which actuates said controller during refill of the hopper whereby, upon completion of the refill cycle, the gate condition is identical with the condition maintained during fill.

References Cited in the file of this patent
UNITED STATES PATENTS

| | | |
|---|---|---|
| 1,983,093 | Montgomery | Dec. 4, 1934 |
| 2,103,400 | Weckerly | Dec. 28, 1937 |
| 2,416,994 | Harper | Mar. 4, 1947 |
| 2,544,155 | Harkenrider | Mar. 6, 1951 |
| 2,607,555 | Noble | Aug. 19, 1952 |
| 2,718,982 | Long | Sept. 27, 1955 |